(12) United States Patent
Machida et al.

(10) Patent No.: US 8,055,260 B2
(45) Date of Patent: Nov. 8, 2011

(54) MOBILE COMMUNICATION SYSTEM, LOCAL SUBSCRIBER INFORMATION MANAGEMENT DEVICE, AND COMMUNICATION INFORMATION MANAGEMENT METHOD

(75) Inventors: Keiji Machida, Yokohama (JP); Hironari Kobayashi, Iruma (JP); Hiroshi Nakamura, Nerima-ku (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 547 days.

(21) Appl. No.: 12/208,788

(22) Filed: Sep. 11, 2008

(65) Prior Publication Data

US 2009/0069010 A1    Mar. 12, 2009

(30) Foreign Application Priority Data

Sep. 12, 2007   (JP) ................................. 2007-236570

(51) Int. Cl.
*H04W 4/00* (2009.01)
(52) U.S. Cl. .................. 455/433; 455/426.1; 455/435.1
(58) Field of Classification Search .................. 455/433, 455/426.1, 435.1
See application file for complete search history.

(56) References Cited

U.S. PATENT DOCUMENTS

| 7,016,677 B2 | 3/2006 | Fukasawa et al. |
| 7,127,246 B1 * | 10/2006 | Muhonen ....................... 455/433 |
| 2009/0156201 A1 | 6/2009 | Pudney et al. |

FOREIGN PATENT DOCUMENTS

| JP | 2002-320032 | 10/2002 |
| JP | 2004-297335 | 10/2004 |
| JP | 2006-005966 | 1/2006 |
| JP | 2006-74404 | 3/2006 |
| WO | WO 01/15478 | * 3/2001 |
| WO | WO 01/15478 A1 | 3/2001 |
| WO | WO 2007/080399 A1 | 7/2007 |

* cited by examiner

*Primary Examiner* — Kamran Afshar
*Assistant Examiner* — Manpreet Matharu
(74) *Attorney, Agent, or Firm* — Crowell & Moring LLP (57) ABSTRACT

The unnecessarily increase of the information amount of subscriber information retained by a local subscriber information management device is prevented even if the number of subscribers increases, so that the limit of the number of subscribers is extended to support the increasing number of subscribers without increasing the capacity of subscriber information retaining means in the local station (local subscriber information management device). Based on information contained in subscriber management information 211, 221 including information representing each mobile terminal 310, 320 acquired by local stations 210, 220 of a mobile communication system 100 and subscriber information corresponding to each mobile terminal 310, 320, the relevant subscriber management information 211, 221 are selected and processed to be prevented from being retained after call control is performed according to the acquired subscriber management information.

8 Claims, 7 Drawing Sheets

MOBILE COMMUNICATION SYSTEM, LOCAL SUBSCRIBER INFORMATION MANAGEMENT DEVICE, AND COMMUNICATION INFORMATION MANAGEMENT METHOD

BACKGROUND OF THE INVENTION

1. Field of the Invention

The present invention relates to a mobile communication system, a local subscriber information management device, and a communication information management method.

2. Description of the Related Art

There is a mobile communication system constructed to include a subscriber original record information management device which manages subscriber original record information that contains original record information of information representing respective mobile terminals and subscriber information corresponding to these mobile terminals, and a local subscriber information management device which acquires subscriber management information that contains information representing the respective mobile terminal that is a visiting mobile terminal and subscriber information corresponding to the respective mobile terminal from the subscriber original record information management device and manages the acquired subscriber management information.

In a mobile communication system conforming to 3GPP (3rd Generation Partnership Projects) recommendation, an HLR (Home Location Register) scheme and a VLR (Visitor Location Register) scheme are defined as schemes for managing a position of a mobile terminal and subscriber information.

In the HLR scheme, information that is an original record of position information of a mobile terminal and subscriber information is managed in an HLR installed physically independently from a mobile switching center.

In the VLR scheme, on the occasion of location registration of a relevant mobile terminal, subscriber information is downloaded from an HLR (i.e., copied from the above described original record) into a VLR of a respective mobile switching center which the mobile terminal has visited, and manages the position information and subscriber information of the mobile terminal.

Incidentally, there is an increasing number of cases where a wireless terminal device having a function as a mobile terminal is provided in a vending machine such as of beverages or cigarettes and is used for inventory control and user authentication.

In the cases as described above, it is allowed to supply a vending machine with sales items according to a current stock instead of based mainly on experience of an operator in a conventional manner, and the security is ensured to a certain extent.

The application of a mobile terminal (wireless terminal device) as described above tends to spread over general-purpose equipment such as household electrical appliances.

The number of mobile terminals accommodated in mobile communication systems is rapidly increasing partly because such a mobile terminal includes not only a device carried by a user but also a device incorporated in various equipment such as a vending machine and general-purpose equipment as described above. This significant increase is easily predicted to be far beyond the increase of actual data traffic.

Specifically, for example, as a mobile terminal carried by a user moves literally, a corresponding current mobile switching center is frequently changed in succession, and only due to this, traffic of management information frequently occurs.

In contrast, with respect to a vending machine or general-purpose equipment, the probability of changing a current mobile switching center is very low in a normal operation or use situation, and therefore traffic of management information regarding this changing rarely occurs.

However, in a design philosophy about conventional mobile communication system operation, the above described local subscriber information management device (VLR in a mobile communication system conforming to 3 GPP recommendation) is assumed to reserve a memory capacity corresponding to the number of mobile terminals.

Toward the forthcoming ubiquitous age, if facilities are added to the local subscriber information management device (VLR) according to the substantial increase of the number of mobile terminals to be accommodated in the mobile communication system, there is a problem that terribly unreasonable excessive facilities are built with respect to actual communication traffic of data.

There has been proposed a technique in which a situation where any more registration into a current mobile switching center (or its VLR) is not allowed is assumed to occur, and when this situation occurs, subscriber information which can be erased without trouble is erased so that free space is reserved.

For example, at a mobile switching center, if subscriber information cannot be newly registered in a first management device for the mobile switching center which manages subscriber information when a location registration signal is received from a mobile terminal, one item of subscriber information currently registered in the first management device for the mobile switching center is deleted to reserve a free space for registration, and subscriber information is registered after the free space is reserved (see JP 2002-320032 A, especially paragraphs 0054 to 0065, FIGS. 9 to 12, and others).

In addition, it has been proposed that at a mobile switching center, if subscriber information cannot be newly registered in a management device for the mobile switching center which manages subscriber information when a location registration signal is received from a mobile terminal, such subscriber information is registered in a management device for another mobile switching center which manages subscriber information.

In this proposal, if subscriber information of a mobile terminal that has sent a transmission signal is not registered in a management device for a mobile switching center which manages subscriber information when the transmission signal is received from the mobile terminal, the subscriber information of the mobile terminal is acquired from a management device for another mobile switching center which manages subscriber information (see JP 2006-5966 A, especially paragraphs 0007 to 0008, 0049 to 0054, 0128, 0248 to 0251, and 0319, FIGS. 6 to 8, and others).

In addition, there has been proposed a technique in which, in a mobile communication system where a plurality of switches manage areas and each mobile switching center retains subscriber information of a mobile terminal visiting in an area managed by the mobile switching center, a communication controller forwards a location registration signal from a mobile terminal to a destination mobile switching center depending on free space of area subscriber information retaining means, and notifies the mobile terminal of the destination mobile switching center which has performed location registration.

In this proposal, it is said that, even if free space of area subscriber information retaining means of one mobile switching center is small, a location registration signal can be forwarded to another mobile switching center so that location registration of a mobile terminal can be performed. And furthermore, since a communication controller notifies a mobile terminal of the destination mobile switching center which has performed location registration, the mobile terminal can send a signal to the destination mobile switching center which retains the subscriber information of the mobile terminal in the area subscriber information retaining means after the location registration, mobile communication service can be provided to more mobile terminals, and connection delay and increase of the amount of signal at sending and receiving can be prevented (see JP 2006-074404 A, especially paragraphs 0020 to 0028, FIGS. 1 and 2, and others).

However, in any of the techniques disclosed in the above patent documents, a situation where any more subscriber information cannot be registered in a current mobile switching center or a subscriber information management device (local station's VLR) is assumed to occur, and when this situation occurs, subscriber information which can be erased without trouble is erased so that free space is reserved and then subscriber information is registered in this mobile switching center or subscriber information management device, or subscriber information is registered in another mobile switching center or subscriber information management device (local station's VLR). Thus, the above-described techniques are not intended to provide a method to prevent or reduce the occurrence of the "situation where any more subscriber information cannot be registered".

SUMMARY OF THE INVENTION

The present invention has been made in view of the above described situation, and is intended to provided a mobile communication system, a local subscriber information management device, and a communication information management method which prevent the information amount of subscriber information retained by a local subscriber information management device from unnecessarily increasing even if the number of subscribers increases, so that the increasing number of subscribers can be supported without increase of capacity of subscriber information retaining means in a local station (local subscriber information management device).

To solve above described problem, the present application proposes the following techniques.

One aspect of the present invention is a mobile communication system including a subscriber original record information management device which manages subscriber original record information that contains original record information of information representing a each mobile terminal and subscriber information corresponding to the respective mobile terminal, and a local subscriber information management device which acquires and manages subscriber management information that contains information representing the respective mobile terminal that is a visiting mobile terminal and subscriber information corresponding to the respective mobile terminal, wherein based on the information contained in the acquired subscriber management information, the local subscriber information management device selects the relevant subscriber management information and performs processing to prevent retention of the relevant subscriber management information after performing call control according to the acquired subscriber management information.

In the mobile communication system as described above, based on the information contained in the acquired subscriber management information, the local subscriber information management device selects the relevant subscriber management information and performs processing to prevent retention of the relevant subscriber management information after performing call control according to the acquired subscriber management information.

As used herein, the processing to prevent retention refers to, for example, erasing (deletion) processing or processing to prevent retention of information as "subscriber information".

Accordingly, even if the number of subscribers increases, the information amount of information retained as subscriber information by the local subscriber information management device does not unnecessarily increase.

Therefore, the limit of the number of subscribers is greatly extended to support the increasing number of subscribers without special means for increasing capacity of subscriber information retaining means in the local station (local subscriber information management device).

The above described mobile communication system may be configured in such a manner that, based on the information representing the mobile terminal contained in the acquired subscriber management information, the local subscriber information management device selects the relevant subscriber management information and performs processing to prevent retention of the relevant subscriber management information after performing call control according to the acquired subscriber management information.

In the above-described manner of the mobile communication system, based on the information representing the mobile terminal contained in the acquired subscriber management information, the local subscriber information management device selects the relevant subscriber management information and performs processing to prevent retention of the subscriber management information after performing call control according to the acquired subscriber management information.

As described above, the processing to prevent retention is, for example, erasing (deletion) processing or processing to prevent retention of information as "subscriber information". Therefore, even if the number of subscribers increases, the increase of information retained as subscriber information by the local subscriber information management device is effectively inhibited, and the limit of the number of subscribers is greatly extended to support the increasing number of subscribers without special means for increasing capacity of subscriber information retaining means.

The above described mobile communication system may be configured in such a manner that, the local subscriber information management device recognizes the information representing the mobile terminal contained in the acquired subscriber management information at a time of location registration about the mobile terminal, and based on the recognized information representing the mobile terminal, selects the relevant subscriber management information and performs processing to prevent retention of the relevant subscriber management information after performing call control according to the acquired subscriber management information.

In the mobile communication system as in this manner, particularly in the above-described manner, whether or not the subscriber management information is processed to be prevented from being retained is determined based on the information representing the mobile terminal recognized at the time of location registration about the mobile terminal. Thus, the information representing the mobile terminal on which the determination relies is recognized during location registration, that is, in process of a normal operation in this type of system. Therefore, a simple system can be built so that an opportunity of such determination occurs without additional special processing.

The above described mobile communication system may be configured in such a manner that, based on the subscriber information contained in the acquired subscriber management information, the local subscriber information management device selects the relevant subscriber management information and performs processing to prevent retention of the relevant subscriber management information after performing call control according to the acquired subscriber management information.

The above described local subscriber information management device, based on the subscriber information contained in the acquired subscriber management information, selects the relevant subscriber management information and performs processing to prevent retention of the subscriber management information after performing call control according to the acquired subscriber management information.

As described above, the processing to prevent retention is, for example, erasing (deletion) processing or processing to prevent retention of information as "subscriber information". Therefore, even if the number of subscribers increases, the increase of information retained as subscriber information by the local subscriber information management device is effectively inhibited, and the limit of the number of subscribers is greatly extended to support the increasing number of subscribers without special means for increasing capacity of subscriber information retaining means.

The above described mobile communication system may be configured in such a manner that, the local subscriber information management device recognizes the subscriber information contained in the acquired subscriber management information at a time of location registration about the mobile terminal, and based on the recognized subscriber information, selects the relevant subscriber management information and performs processing to prevent retention of the relevant subscriber management information after performing call control according to the acquired subscriber management information.

In the mobile communication system as in this manner, particularly in the above-described manner, whether or not the subscriber management information is processed to be prevented from being retained is determined based on the subscriber information recognized at the time of location registration about the mobile terminal. Thus, the subscriber information on which the determination relies is recognized during location registration, that is, in process of a normal operation in this type of system. Therefore, a simple system can be built so that an opportunity of such determination occurs without additional special processing.

Another aspect of the present invention is a local subscriber information management device operatively connected to a subscriber original record information management device which manages subscriber original record information that contains original record information of information representing a each mobile terminal and subscriber information corresponding to the respective mobile terminal, in a mobile communication system, wherein the local subscriber information management device which acquires and manages subscriber management information that contains information representing the respective mobile terminal that is a visiting mobile terminal and subscriber information corresponding to the respective mobile terminal, and wherein based on the information contained in the acquired subscriber management information, the relevant subscriber management information is selected and processed to be prevented from being retained after call control is performed according to the acquired subscriber management information.

In the local subscriber information management device as described above, based on the information contained in the acquired subscriber management information, the relevant subscriber management information is selected and processed to be prevented from being retained after call control is performed according to the acquired subscriber management information.

As used herein, the processing to prevent retention refers to, for example, erasing (deletion) processing or processing to prevent retention of information as "subscriber information".

Accordingly, even if the number of subscribers increases, the information amount of information retained as subscriber information by the local subscriber information management device does not unnecessarily increase.

Therefore, the limit of the number of subscribers is greatly extended to support the increasing number of subscribers without special means for increasing capacity of subscriber information retaining means in the local station (local subscriber information management device).

The above described local subscriber information management device may be configured in such a manner that, based on the information representing the mobile terminal contained in the acquired subscriber management information, the relevant subscriber management information is selected and processed to be prevented from being retained after call control is performed according to the acquired subscriber management information.

In the above-described manner of the local subscriber information management device, based on the information contained in the acquired subscriber management information, the relevant subscriber management information is selected and processed to be prevented from being retained after call control is performed according to the acquired subscriber management information.

As described above, the processing to prevent retention is, for example, erasing (deletion) processing or processing to prevent retention of information as "subscriber information". Therefore, even if the number of subscribers increases, the increase of information retained as subscriber information by the local subscriber information management device is effectively inhibited, and the limit of the number of subscribers is greatly extended to support the increasing number of subscribers without special means for increasing capacity of subscriber information retaining means.

The above described local subscriber information management device may be configured in such a manner that the information representing the mobile terminal contained in the acquired subscriber management information is recognized at a time of location registration about the mobile terminal, and based on the recognized information representing the mobile terminal, the relevant subscriber management information is selected and processed to be prevented from being retained after call control is performed according to the acquired subscriber management information.

In the local subscriber information management device as in this manner, particularly in the above-described manner, whether or not the subscriber management information is processed to be prevented from being retained is determined based on the information representing the mobile terminal recognized at the time of location registration about the mobile terminal. Thus, the information representing the mobile terminal on which the determination relies is recognized during location registration, that is, in process of a normal operation in this type of system. Therefore, a simple system can be built so that an opportunity of such determination occurs without additional special processing.

The above described local subscriber information management device may be configured in such a manner that, based on the subscriber information contained in the acquired subscriber management information, the relevant subscriber management information is selected and processed to be prevented from being retained after call control is performed according to the acquired subscriber management information.

In the above-described manner of the local subscriber information management device, based on the subscriber information contained in the acquired subscriber management information, the relevant subscriber management information is selected and processed to be prevented from being retained after call control is performed according to the acquired subscriber management information.

As described above, the processing to prevent retention is, for example, erasing (deletion) processing or processing to prevent retention of information as "subscriber information". Therefore, even if the number of subscribers increases, the increase of information retained as subscriber information by the local subscriber information management device is effectively inhibited, and the limit of the number of subscribers is greatly extended to support the increasing number of subscribers without special means for increasing capacity of subscriber information retaining means.

The above described local subscriber information management device may be configured in such a manner that the subscriber information contained in the acquired subscriber management information is recognized at a time of location registration about the mobile terminal, and based on the recognized subscriber information, the relevant subscriber management information is selected and processed to be prevented from being retained after call control is performed according to the acquired subscriber management information.

In the local subscriber information management device as in this manner, particularly in the above-described manner, whether or not the subscriber management information is processed to be prevented from being retained is determined based on the subscriber information recognized at the time of location registration about the mobile terminal. Thus, the subscriber information on which the determination relies is recognized during location registration, that is, in process of a normal operation in this type of system. Therefore, a simple system can be built so that an opportunity of such determination occurs without additional special processing.

A yet another aspect of the present invention is a communication information management method in a mobile communication system including a subscriber original record information management device which manages subscriber original record information that contains original record information of information representing a each mobile terminal and subscriber information corresponding to the respective mobile terminal, and a local subscriber information management device which acquires and manages subscriber management information that contains information representing the respective mobile terminal that is a visiting mobile terminal and subscriber information corresponding to the respective mobile terminal, the method including: based on the information contained in the acquired subscriber management information, selecting the relevant subscriber management information and performing processing to prevent retention of the relevant subscriber management information after performing call control according to the acquired subscriber management information.

The communication information management method as described above, based on the information contained in the acquired subscriber management information, selects the relevant subscriber management information and performs processing to prevent retention of the relevant subscriber management information after performing call control according to the acquired subscriber management information.

As used herein, the processing to prevent retention refers to, for example, erasing (deletion) processing or processing to prevent retention of information as "subscriber information".

Accordingly, even if the number of subscribers increases, the information amount of information retained as subscriber information by the local subscriber information management device does not unnecessarily increase.

Therefore, the limit of the number of subscribers is greatly extended to support the increasing number of subscribers without special means for increasing capacity of subscriber information retaining means in the local station (local subscriber information management device).

The above described communication information management method may be configured such a manner to, based on the information representing the mobile terminal contained in the acquired subscriber management information, select the relevant subscriber management information and perform processing to prevent retention of the relevant subscriber management information after performing call control according to the acquired subscriber management information.

In the above-described manner of the communication information management method, based on the information representing the mobile terminal contained in the acquired subscriber management information, the subscriber management information is selected and processed to be prevented from being retained after call control is performed according to the acquired subscriber management information.

As described above, the processing to prevent retention is, for example, erasing (deletion) processing or processing to prevent retention of information as "subscriber information". Therefore, even if the number of subscribers increases, the increase of information retained as subscriber information by the local subscriber information management device is effectively inhibited, and the limit of the number of subscribers is greatly extended to support the increasing number of subscribers without special means for increasing capacity of subscriber information retaining means.

The above described communication information management method may be configured such a manner to recognize the information representing the mobile terminal contained in the acquired subscriber management information at a time of location registration about the mobile terminal, and based on the recognized information representing the mobile terminal, select the relevant subscriber management information and perform processing to prevent retention of the relevant subscriber management information after performing call control according to the acquired subscriber management information.

In the communication information management method as in this manner, particularly in the above-described manner, whether or not the subscriber management information is processed to be prevented from being retained is determined based on the information representing the mobile terminal recognized at the time of location registration about the mobile terminal. Thus, the information representing the mobile terminal on which the determination relies is recognized during location registration, that is, in process of a normal operation in this type of communication information management method. Therefore, a simple system can be built so that an opportunity of such determination occurs without additional special processing.

The above described communication information management method may be configured such a manner to, based on the subscriber information contained in the acquired subscriber management information, select the relevant subscriber management information and perform processing to prevent retention of the relevant subscriber management information after performing call control according to the acquired subscriber management information.

In the above-described manner of the communication information management method, based on the subscriber information contained in the acquired subscriber management information, the relevant subscriber management information is selected and processed to be prevented from being retained after call control is performed according to the acquired subscriber management information.

As described above, the processing to prevent retention is, for example, erasing (deletion) processing or processing to prevent retention of information as "subscriber information". Therefore, even if the number of subscribers increases, the increase of information retained as subscriber information by the local subscriber information management device is effectively inhibited, and the limit of the number of subscribers is greatly extended to support the increasing number of subscribers without special means for increasing capacity of subscriber information retaining means.

The above described communication information management method may be configured such a manner to recognize the subscriber information contained in the acquired subscriber management information at a time of location registration about the mobile terminal, and based on the recognized subscriber information, select the relevant subscriber management information and perform processing to prevent retention of the relevant subscriber management information after performing call control according to the acquired subscriber management information.

In the communication information management method as in this manner, particularly in the above-described manner, whether or not the subscriber management information is processed to be prevented from being retained is determined based on the subscriber information recognized at the time of location registration about the mobile terminal. Thus, the subscriber information on which the determination relies is recognized during location registration, that is, in process of a normal operation in this type of communication information management method. Therefore, a simple system can be built so that an opportunity of such determination occurs without additional special processing.

A further another aspect of the present invention is a communication information management method including, based on information contained in subscriber management information that contains information representing each mobile terminal and subscriber information corresponding to the respective mobile terminal and that is acquired by a local station of a mobile communication system, selecting the relevant subscriber management information and performing processing to prevent retention of the relevant subscriber management information after performing call control according to the acquired subscriber management information.

This communication information management method, based on the information contained in the subscriber management information acquired by the local station of the mobile communication system, selects the relevant subscriber management information and performs processing to prevent retention of the relevant subscriber management information after performing call control according to the acquired subscriber management information.

As used herein, the processing to prevent retention refers to, for example, erasing (deletion) processing or processing to prevent retention of information as "subscriber information".

Accordingly, even if the number of subscribers increases, the information amount of information retained as subscriber information by the local subscriber information management device does not unnecessarily increase.

Therefore, the limit of the number of subscribers is greatly extended to support the increasing number of subscribers without special means for increasing capacity of subscriber information retaining means in the local station (local subscriber information management device).

According to the present invention, a mobile communication system, a local subscriber information management device, and a communication information management method are provided which prevent the information amount of subscriber information (subscriber management information) retained by a local subscriber information management device from unnecessarily increasing even if the number of subscribers increases, so that the increasing number of subscribers can be supported without increase of capacity of subscriber information retaining means in a local station (local subscriber information management device).

DETAILED DESCRIPTION OF THE PREFERRED EMBODIMENTS

Hereinafter, embodiments of the present invention will be described in detail with reference to the drawings to clarify the present invention.

(General Description of a Mobile Communication System as an Embodiment)

Figure 1:
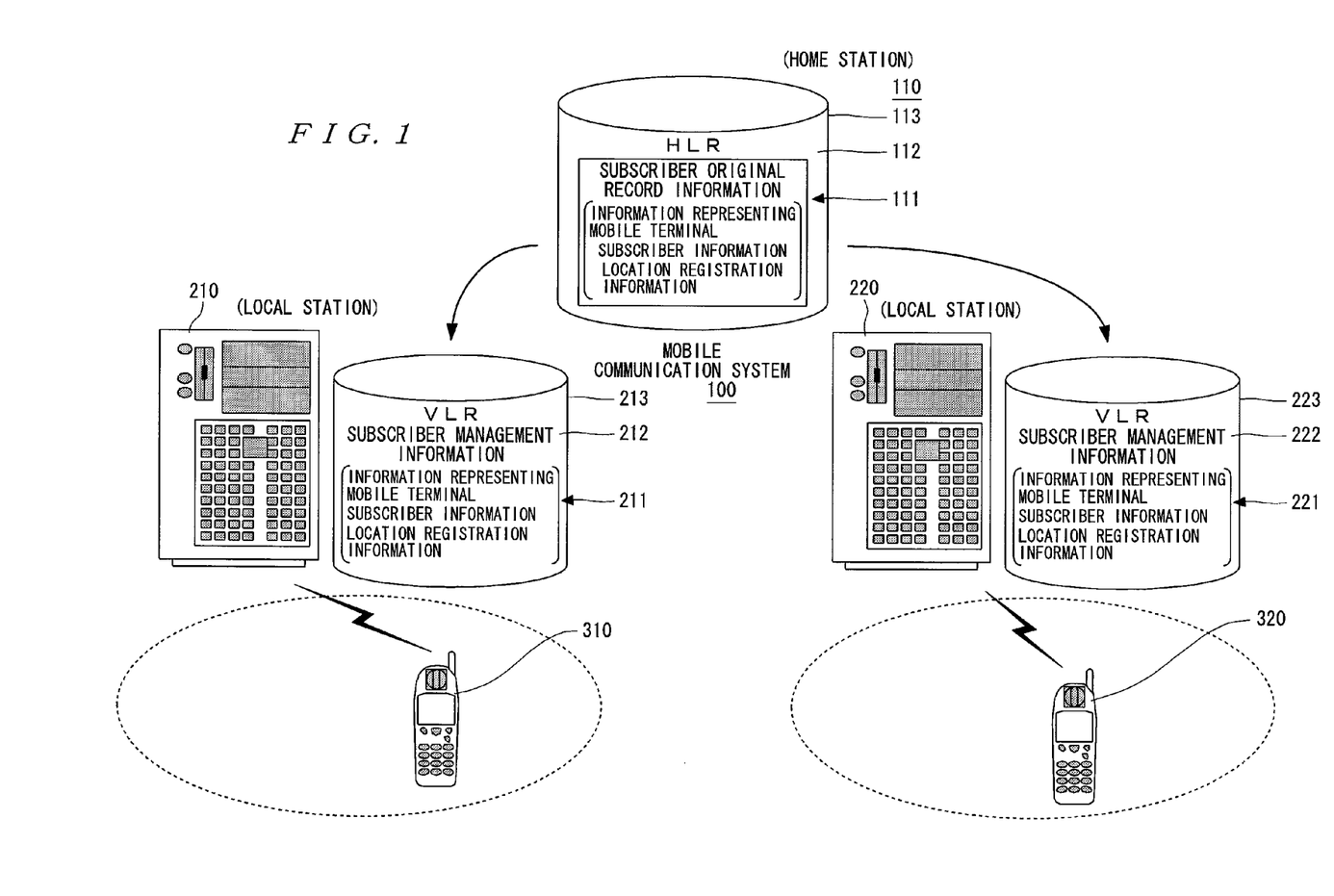
FIG. 1 is a schematic diagram of a mobile communication system as an embodiment of the present invention.

FIG. 1 is a schematic diagram of a mobile communication system 100 as an embodiment of the present invention.

In the example of the diagram, the mobile communication system includes one home station 110 and a plurality of local stations 210 and 220 (for illustrative purposes, two local stations in the diagram).

The home station 110 includes a subscriber original record management device 113 which retains and manages subscriber original record information 111 in an information storage device 112. The subscriber original record information 111 contains original record information of information representing mobile terminals 310, 320, and the like, and subscriber information corresponding to the mobile terminals 310, 320, and the like.

The subscriber original record information 111 also contains location registration information corresponding to mobile terminals 310, 320, and the like, in addition to the original record information of information representing mobile terminals 310, 320, and the like and subscriber information corresponding to the mobile terminals 310, 320, and the like.

Inside the local station 210, which forms a mobile switching center, there is provided a local subscriber information management device 213 which acquires subscriber management information 211 that contains information representing the mobile terminal 310 that is a visiting mobile terminal and subscriber information corresponding to the mobile terminal 310, retains the acquired information in an information storage device 212 temporarily or for a predetermined period in a desired manner, and manages the retained information in a way that it can be used for call control.

The subscriber management information 211 contains location registration information corresponding to the mobile terminal 310 in addition to information representing the visiting mobile terminal 310 and subscriber information corresponding to the mobile terminal 310.

Also inside the local station 220, which forms a mobile switching center as in the local station 210, there is provided a local subscriber information management device 223 which acquires subscriber management information 221 that contains information representing the mobile terminal 320 that is a visiting mobile terminal and subscriber information corresponding to the mobile terminal 320, retains the acquired information in an information storage device 222 temporarily or for a predetermined period in a desired manner, and manages the retained information in a way that it can be used for call control.

The subscriber management information 211 contains location registration information corresponding to the mobile terminal 320 in addition to information representing the visiting mobile terminal 320 and subscriber information corresponding to the mobile terminal 320.

Particularly in a mobile communication system conforming to 3GPP (3rd Generation Partnership Projects) recommendation, an HLR (Home Location Register) corresponds to the subscriber original record information management device 113, and a VLR (Visitor Location Register) corresponds to the local subscriber information management device 223.

As previously described, in the VLR scheme, on the occasion of location registration of a relevant mobile terminal, subscriber information is downloaded from an HLR (i.e., copied from the above described subscriber original record information 111) into a VLR of a respective mobile switching center which the mobile terminal has visited, and manages the position information and subscriber information of the mobile terminal.

However, in the embodiment of the present invention, instead of being downloaded as a copy from the subscriber original record information 111 as described above (although this type of acquisition is not excluded), the subscriber management information 211 (221) is acquired by the local subscriber information management device 213 (223) directly from a visiting mobile terminal. Thereby, the processing time for acquisition can be reduced.

In the present invention, the local subscriber information management device 213 (223) selects the relevant subscriber management information 211 (221) and performs processing to prevent retention of the relevant subscriber management information 211 (221) based on a predetermined determination after call control is performed according to the acquired subscriber management information 211 (221) as described above.

This determination relies on information contained in the acquired subscriber management information 211 (221) as described above. Specifically, it relies on, for example, information representing the mobile terminal 310 (320) contained in the subscriber management information 211 (221) or subscriber information corresponding to the mobile terminal 310 (320).

The processing to prevent retention as described above refers to, for example, erasing (deletion) processing or processing to prevent retention of information as "subscriber information".

As previously described, as a mobile terminal carried by a user moves, a corresponding current mobile switching center is frequently changed, and only due to this, traffic of management information frequently occurs. In contrast, with respect to a mobile terminal incorporated in a vending machine or general-purpose equipment, the probability of changing a current mobile switching center is very low in a normal operation, and therefore traffic of management information regarding this changing rarely occurs.

A type of mobile terminal in a situation as described above is identified based on the subscriber management information 211 (information representing the mobile terminal or subscriber information corresponding to the mobile terminal that is contained in the subscriber management information 211) acquired by the local subscriber information management device 213.

Therefore, for example, as one idea, when the mobile terminal is identified as a mobile terminal by which management information traffic rarely occurs, management information regarding the mobile terminal is not stored point by point in a local subscriber information management device in a current mobile switching center, and the management information is processed to be prevented from being retained after (if necessary, immediately after) call control is performed using the management information.

By the procedure as described above, even if the number of subscriber increases, the information amount of information retained as subscriber information by the local subscriber information management device 213 (223) can be prevented from increasing unnecessarily.

In other words, the limit of the number of subscribers is greatly extended to support the increasing number of subscribers without special means for increasing capacity of subscriber information retaining means in the local station (local subscriber information management device).

In the mobile communication system 100, the local subscriber information management device 210 (220) may be configured in such a manner that the information representing the mobile terminal (or the subscriber information) contained in the subscriber management information 211 (221) acquired as described above is recognized at a time of location registration about the mobile terminal, and based on the recognized information representing the mobile terminal (or the subscriber information), the relevant subscriber management information (which corresponds to, but is not limited to, subscriber management information about a mobile terminal incorporated in a vending machine or general-purpose equipment in the above example) is selected and processed to be prevented from being retained after call control is performed according to the acquired subscriber management information.

When the mobile communication system 100 is built in this manner, particularly in the above-described manner, whether or not the subscriber management information is processed to be prevented from being retained is determined based on the subscriber information recognized at the time of location registration about the mobile terminal.

Thus, the subscriber management information (the information representing the mobile terminal or the subscriber information) on which the determination relies is recognized during location registration, that is, in process of a normal operation in this type of system. Therefore, a simple system can be built so that an opportunity of such determination occurs without additional special processing.

Hereinafter, there will be described an operation of a local subscriber information management device as one embodiment of the present invention in a local station in a case where the mobile communication system is configured in conformity to 3GPP recommendation.

Figure 2:
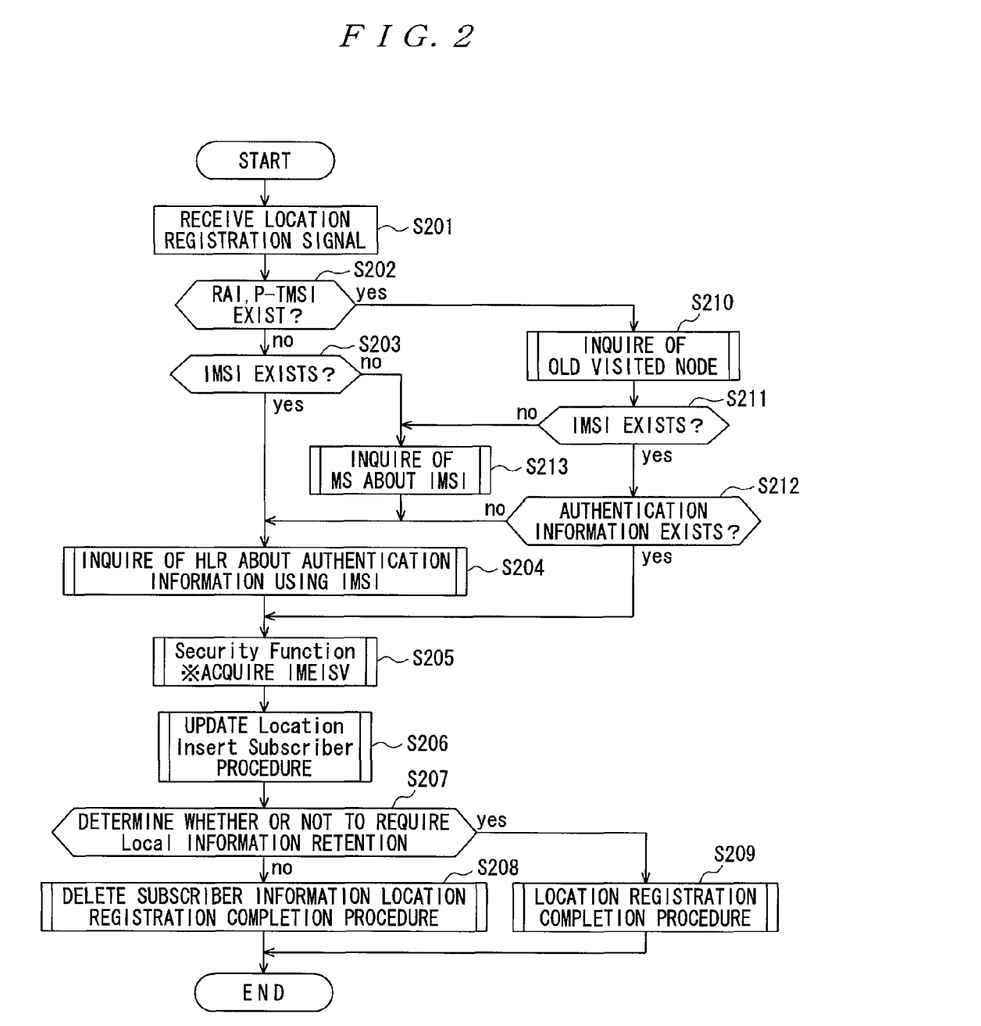
FIG. 2 is a flowchart of an operation of location registration of a local subscriber information management device as one embodiment of the present invention.

FIG. 2 is a flowchart of an operation of location registration of the local subscriber information management device as one embodiment of the present invention.

When a visiting mobile terminal is powered on, a location registration signal is received (step S201). Then, whether RAI (Routing Area Identification), P-TMSI (Packet Temporary Mobile Subscriber Identity) exist or not is determined for the received location registration signal (step S202). In step S202, whether or not location registration has been performed in this area in the past is determined by whether RAI or P-TMS which is a temporal subscriber identification number exists or not.

If RAI, P-TMS do not exist as a result of the determination in step S202 (step S202: No), then whether IMSI (International Mobile Subscriber Identity) exists or not, i.e., whether subscriber information exists or not is determined (step S203).

If IMSI exists as a result of the determination in step S203 (step S203: Yes), then a subroutine is executed which inquires of an HLR (Home Location Register) about authentication information using the IMSI (step S204).

After the processing of step S204, a subroutine of Security Function (processing for secrecy of communication) is executed, and IMEISV or IMEI is thereby acquired (step S205).

In this embodiment, IMEISV (International Mobile station Equipment Identity and Software Version Number) or IMEI (International Mobile station Equipment Identity) is acquired from a mobile terminal, instead of being acquired from an original record in the HLR (although this type of acquisition is not excluded).

The Security Function processing (step S205) itself is ordinary, and in this processing, IMEISV or IMEI is acquired without additional special processing.

Therefore, if it is configured that IMEISV or IMEI to be used in subsequent processing is acquired at the timing of step S205, complicated processing for acquisition of them is simplified.

After step S205, processing of UPDATE Location Insert Subscriber is executed (step S206). Processing of step S206, which will be described in detail later, is processing to register a location in an original record of the HLR and download subscriber information into a local station (VLR).

After the processing of step S206, the management information about the mobile terminal is retained and whether or not to complete the location registration is determined based on the IMEISV or IMEI acquired in step S205 (step S207).

If it is determined based on IMEISV or IMEI that management information of the mobile terminal is processed to be prevented from being retained (step S207: No), for example, since the mobile terminal is incorporated in a vending machine or general-purpose equipment as previously above, then the processing to prevent retention and the processing to complete location registration are executed (step S208).

On the other hand, if it is determined based on IMEISV or IMEI that management information of the mobile terminal is to be retained (step S207: Yes), then the processing to complete location registration is executed but the processing to prevent retention is not executed (step S209).

As a result of the determination in step S202, if RAI, P-TMS exist (step S202: Yes), as it means that location registration has been performed in this area in the past, an inquiry about the IMSI of the mobile terminal is made to a relevant local station (VLR) obtained from a communication history (step S210).

Whether IMSI exists or not is determined (step S211), and if IMSI is determined to exist (step S211: Yes), then whether authentication information exists or not is determined (step S212).

If authentication information is determined to exist (step S212: Yes), the process proceeds to the previously described step S205.

On the other hand, if authentication information is determined not to exist (step S212: No), the process proceeds to the previously described step S204.

In step S203 or step S211, if IMSI is determined not to exist (step S203, S211: No), a subroutine is executed to inquire of an MS (Mobile Station) about IMSI, and the process proceeds to the previously described step S204.

Figure 3:
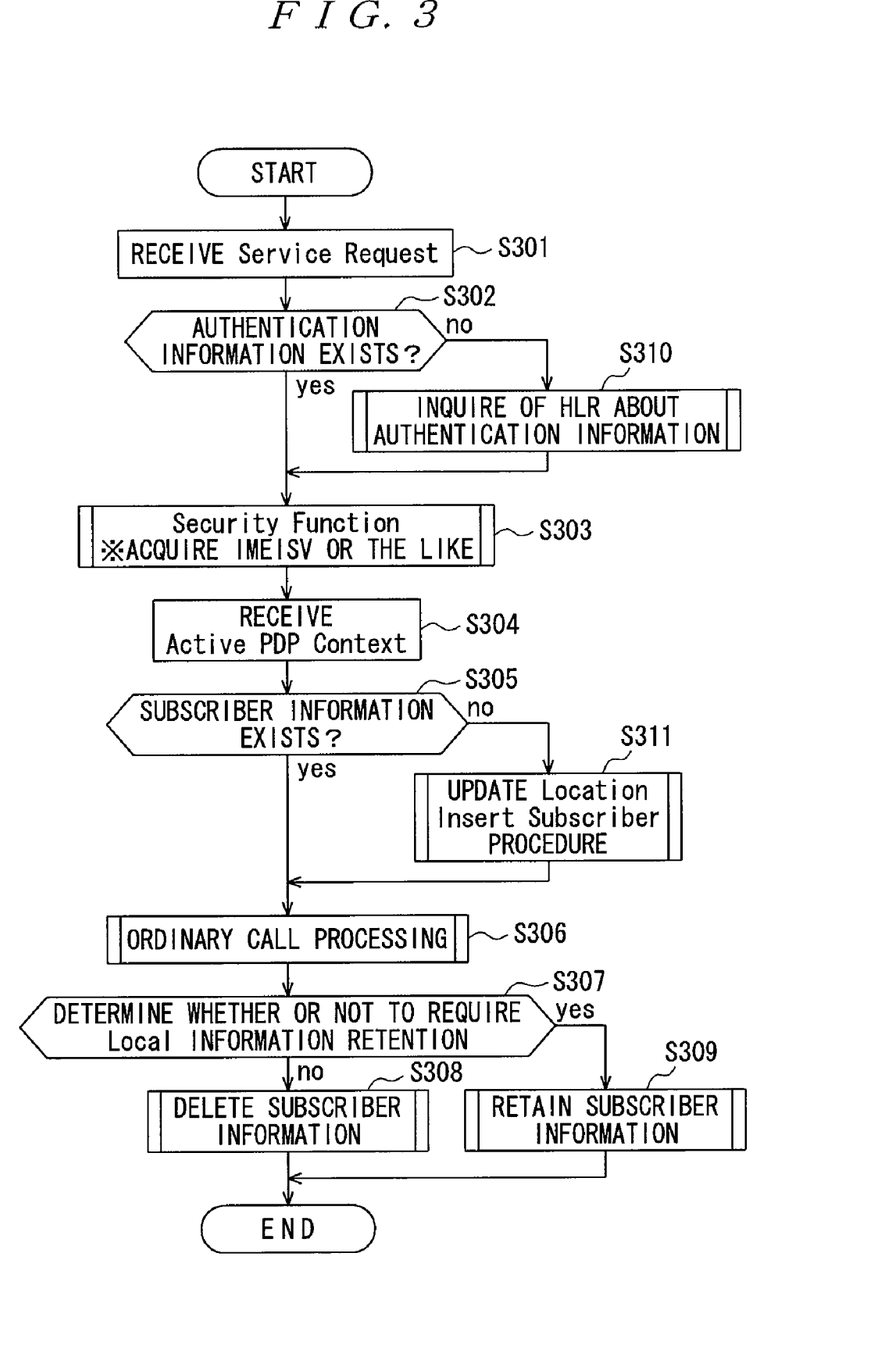
FIG. 3 is a flowchart of an operation of call processing of a local subscriber information management device as one embodiment of the present invention.

FIG. 3 is a flowchart of an operation of call processing of a local subscriber information management device as one embodiment of the present invention.

A Service Request (call request) is received (step S301), and whether authentication information exists or not is determined (step S302).

If authentication information is determined to exist in step S302 (step S302: Yes), then a subroutine of Security Function (processing for secrecy of communication) is executed (step S303).

In processing of step S303, IMEISV or IMEI is acquired by execution of the subroutine of Security Function (processing for secrecy of communication).

In this embodiment, IMEISV or IMEI is acquired from a mobile terminal, instead of being acquired from an original record in the HLR (although this type of acquisition is not excluded).

The Security Function processing (step S303) itself is ordinary, and in this processing, IMEISV or IMEI is acquired without additional special processing.

Therefore, if it is configured that IMEISV or IMEI to be used in subsequent processing is acquired at the timing of step S303, complicated processing for acquisition of them is simplified.

After the execution of step S303, an Active PDP Context (which contains establishment declaration of packet connection or the like) (step S304).

Then, whether subscriber information exists or not is determined (step S305), and if subscriber information is determined to exist (step S305: Yes), normal call processing is executed (step S306).

After the processing of step S306, whether or not to retain the management information about the mobile terminal and complete the location registration is determined (step S307) based on the IMEISV or IMEI acquired in step S303.

If it is determined based on the IMEISV or IMEI that management information of the mobile terminal is processed to be prevented from being retained (step S307: No), for example, since the mobile terminal is incorporated in a vending machine or general-purpose equipment as previously above, then the processing to prevent retention and the processing to complete location registration are executed (step S308).

On the other hand, if it is determined based on the IMEISV or IMEI acquired in step S303 that management information of the mobile terminal is to be retained (step S307: Yes), then the processing to complete location registration is executed but the processing to prevent retention is not executed (step S309).

In the previously described step S302, if authentication information is determined not to exist (step S302: No), then a subroutine is executed to inquire of the HLR about authentication information (step S310).

After the step S310, the process proceeds to the previously described step S303.

In the previously described step S305, if authentication information is determined not to exist (step S305: No), processing of UPDATE Location Insert Subscriber is executed (step S311).

In this step S311, the location is registered in an original record of the HLR, and the subscriber information is downloaded into a local station (VLR). After the processing of step S311, the process proceeds to the previously described step S306.

Figure 4:
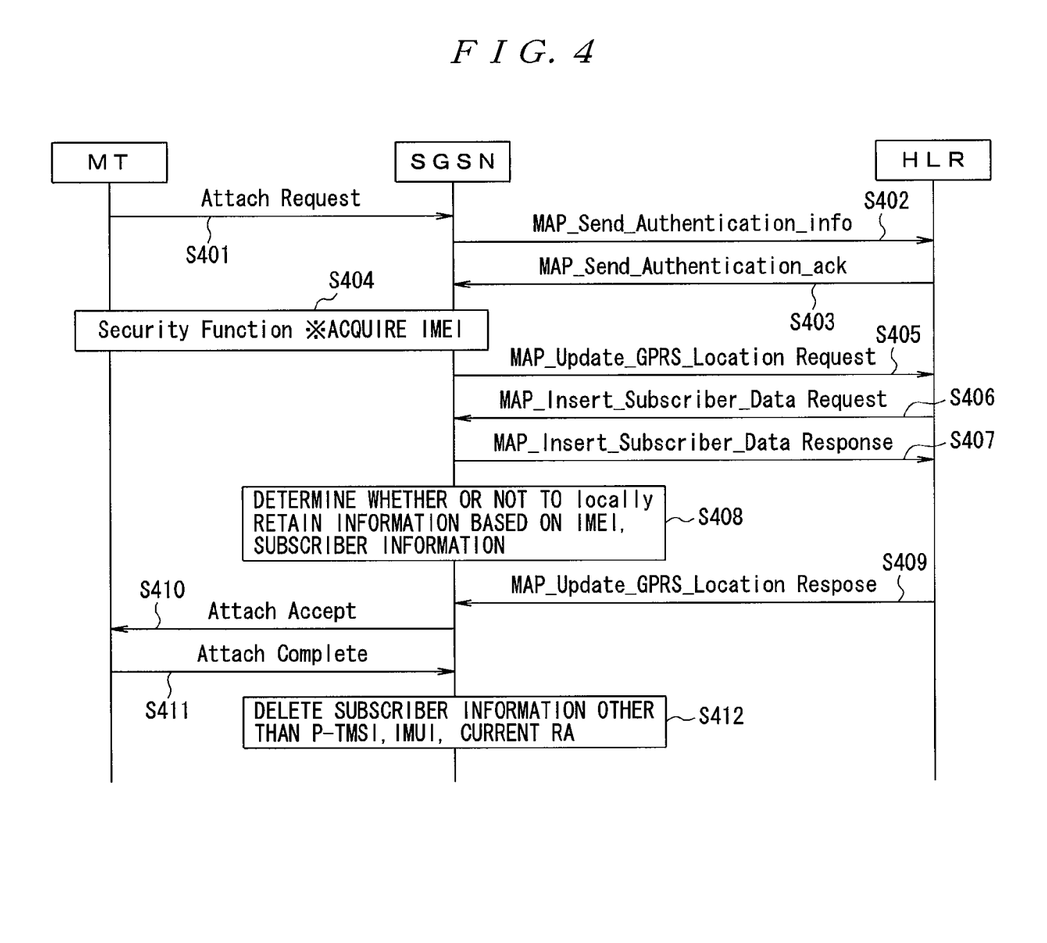
FIG. 4 is a diagram of a communication sequence (first location registration) in a mobile communication system as an embodiment of the present invention.

FIG. 4 is a diagram of a communication sequence in the mobile communication system as the embodiment of the present invention. Specifically, FIG. 4 illustrates a communication sequence of first location registration processing during packet communication.

From a mobile terminal (MT), an Attach request, which is a location registration request, is sent to a current node (SGSN; Serving General packet radio service Node), which is a local station (local subscriber information management device) (step S401).

The SGSN sends MAP_Send_Authentication_info, which is a request to acquire subscriber authentication information, to an HLR (Home Location Register), which is a subscriber original record information management device (step S402).

When there is a response MAP_Send_Authentication_ack (step S403) which is a response to the request MAP_Send_Authentication_info of step S402, processing for secrecy of communication (Security Function) is executed between the MT and the SGSN (step S404).

In process of this Security Function, the SGSN acquires IMEI (International Mobile Equipment Identity) data.

Then, the SGSN sends a MAP_Update_GPRS Location Request, which is a location registration request about the relevant mobile terminal, to the HLR (step S405).

On the other hand, the HLR sends a MAP_Insert_SUBSCRIBER_Data Request signal, which is a request to acquire subscriber information (step S406).

As a response to the MAP_Insert_Subscriber_Data Request of step S406, a MAP_Insert_Subscriber_Data_Response is sent from the SGSN to the HLR (step S407).

At this stage, the SGSN determines whether or not to retain the IMEI and subscriber information in the current node (SGSN), which is the local station (local subscriber information management device), based on the IMEI and the subscriber information (step S408).

As a response to the MAP_Update_GPRS Location Request of the previously described step S405, a MAP_Update_GPRS Location_Response is sent which is a notification of completion of the location registration from the HLR to the SGSN (step S409).

By the above described sending/receiving of data from step S405 to step S409, the procedure for registering the location in the original record of the HLR and downloading the subscriber information into the local SGSN is completed. This procedure corresponds to the processing of step S206 in the previously illustrated flowchart of FIG. 2.

The SGSN gives Attach Accept, which is a notification of completion of the location registration, to the MT (step S410), and the MT sends back a reception acknowledgment Attach Complete to the SGSN, thereby establishing call setting (step S411).

At the timing after step S411, subscriber information other than the current RA (Routing Area) such as P-TMSI (Packet Temporary Mobile Subscriber Identity) and subscriber identifier (IMUI: International Mobile User Identifier) is deleted (step S412).

Figure 5:
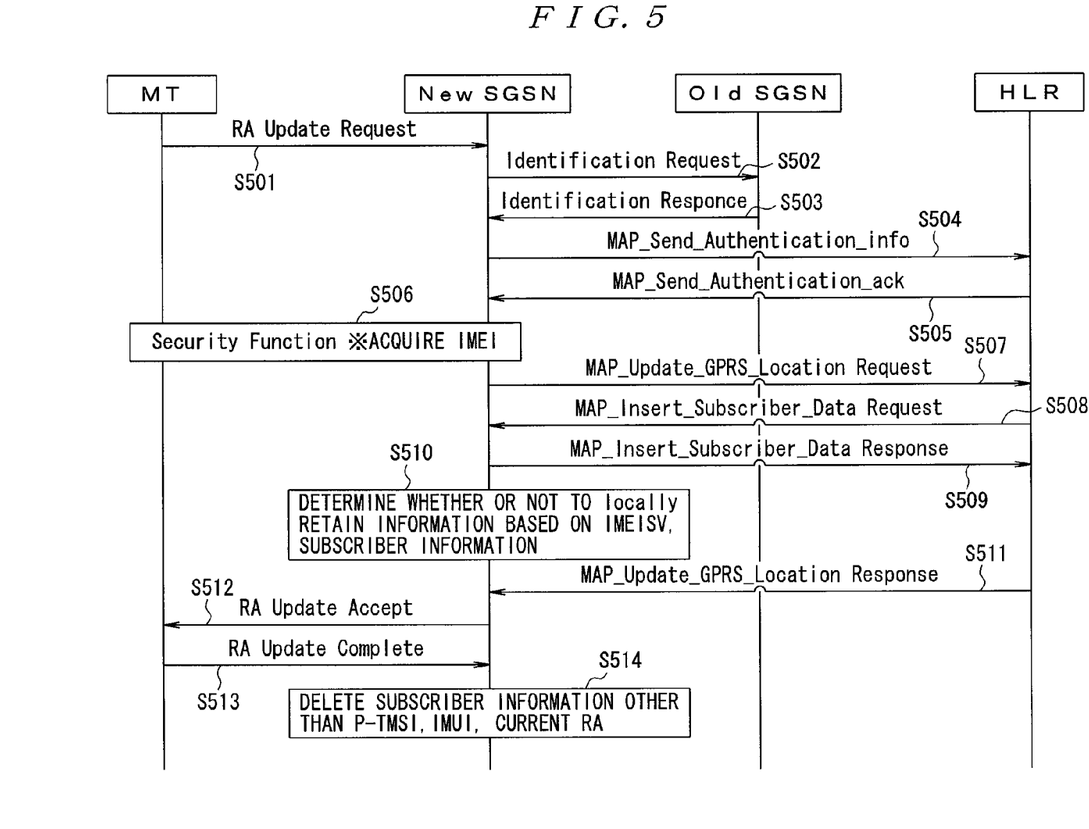
FIG. 5 is a diagram of the communication sequence (second or later location registration) in the mobile communication system as the embodiment of the present invention.

FIG. 5 is a diagram of a communication sequence in the mobile communication system as the embodiment of the present invention. Specifically, FIG. 5 illustrates a communication sequence of second or later location registration processing during packet communication.

In step S501, a location registration request RA Update Request is sent from the MT to an SGSN (represented as New SGSN in FIG. 5) which the MT has visited after it moved.

In step S502, the New SGSN sends an Identification Request to the SGSN which the MT had visited before (represented as Old SGSN in FIG. 5) in order to inquire for subscriber information.

If relevant information is retained in the Old SGSN, the subscriber information (Identification Response) is sent from the Old SGSN to the New SGSN (step S503).

On the other hand, if relevant information is not retained in the Old SGSN, the New SGSN sends a MAP_Send_Authentication_info signal to the HLR (Home Location Register) which is a subscriber original record information management device, thereby inquiring whether the MT is a genuine subscriber or not (step S504).

If there is an acknowledgment (MAP_Send_Authentication_ack) to the inquiry of step S504 (step S505), processing for secrecy of communication (Security Function) is executed between the MT and the New SGSN (step S506).

In process of this Security Function, the SGSN acquires IMEI (International Mobile Equipment Identity) data.

Then, the SGSN sends a MAP_Update_GPRS Location Request, which is a location registration request about the relevant mobile terminal, to the HLR (step S507).

On the other hand, the HLR sends a MAP_Insert_Subscriber_Data Request, which is an acknowledgement request about the subscriber (step S508).

As a response to the MAP_Insert_Subscriber_Data Request of step S508, a MAP_Insert_Subscriber_Data_Response is sent from the New SGSN to the HLR (step S509).

At this stage, the New SGSN determines whether or not to retain the IMEISV and subscriber information in the current node (New SGSN), which is the local station (local subscriber information management device), based on the IMEISV and the subscriber information (step S510).

As a response to the MAP_Update_GPRS Location Request of the previously described step S507, a MAP_Update_GPRS Location_Response is sent from the HLR to the New SGSN (step S511).

By the above described sending/receiving of data from step S507 to step S511, the procedure for registering the location in the original record of the HLR and downloading the subscriber information into the local New SGSN is completed.

The New SGSN allows the MT to update the connection (RA Update Accept) (step S512), and the MT sends back RA Update Complete to the New SGSN, thereby establishing call setting again (step S513).

At the timing after step S511, subscriber information other than the current RA (Routing Area) such as P-TMSI (Packet Temporary Mobile Subscriber Identity) and subscriber identifier (IMUI: International Mobile User Identifier) is deleted (step S514).

Figure 6:
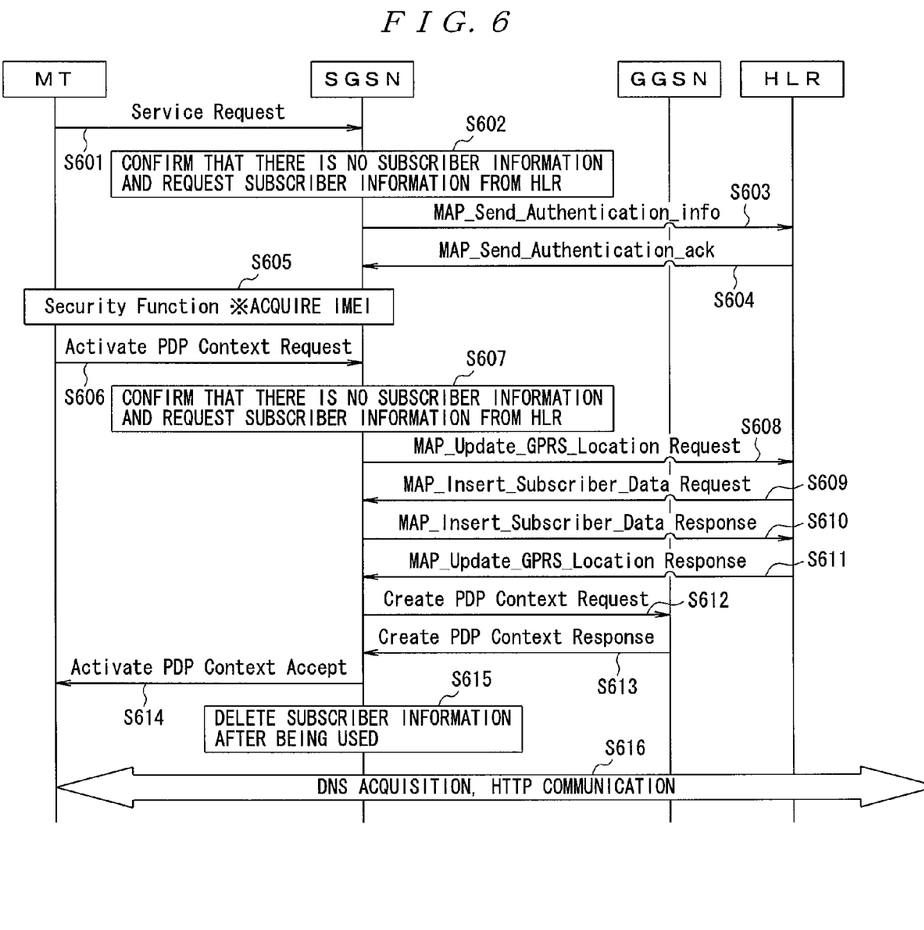
FIG. 6 is a diagram of a communication sequence (at the time of packet transmission) in the mobile communication system as the embodiment of the present invention.

FIG. 6 is a diagram of a communication sequence in the mobile communication system as the embodiment of the present invention. Specifically, FIG. 6 illustrates a communication sequence at the time of packet transmission.

A communication connection request, Service Request, is sent from an MT to an SGSN (step S601).

Upon receiving the signal of step S601, the SGSN confirms that there is no subscriber information and requests subscriber information from an HLR (step S602).

Specifically, at first, a MAP_Send_Authentication_info signal is sent from the SGSN to the HLR, thereby inquiring whether the MT is a genuine subscriber or not (step S603).

If there is an acknowledgment (MAP_Send_Authentication_ack) to the inquiry of step S603 (step S604), processing for secrecy of communication (Security Function) is executed between the MT and the New SGSN (step S605).

In process of this Security Function, the SGSN acquires IMEI (International Mobile Equipment Identity) data.

A PDP context activation request (Active PCP Context Request), which is a service request after communication connection admission, is transmitted from the MT to the SGSN (step S606).

After step S606, the SGSN confirms that there is no subscriber information and requests subscriber information from the HLR (step S607).

Specifically, the SGSN sends a MAP_Update_GPRS Location Request, which is a location registration request about the relevant mobile terminal, to the HLR (step S608).

On the other hand, the HLR sends a MAP_Insert_Subscriber_Data Request, which is an acknowledgement request about the subscriber (step S609).

As a response to the MAP_Insert_Subscriber_Data Request of step S609, a MAP_Insert_Subscriber_Data_Response is sent from the SGSN to the HLR (step S610).

As a response to the MAP_Update_GPRS Location Request of step S608, a MAP_Update_GPRS Location Response is sent from the HLR to the SGSN (step S611).

Then, a PDP context creation request (Create PDP Context Request), which is a service connection request between the SGSN and a GGSN (Gateway GPRS Support Node), is sent from the SGSN to the GGSN (step S612).

In response to the request of step S612, a PDP context creation response (Create PDP Context Response) is sent back from the GGSN to the SGSN (step S613).

The SGSN sends back a PDP context activation request acceptance (Active PDP Context Accept) (step S614).

At the timing after step S614, subscriber information other than the current RA (Routing Area) such as P-TMSI (Packet Temporary Mobile Subscriber Identity) and subscriber identifier (IMUI: International Mobile User Identifier) is deleted (step S615).

The MT can acquire a domain name of the DNS (Domain Name System) (DNS acquisition) and perform HTTP (HyperText Transfer Protocol) communication (step S616).

Figure 7:
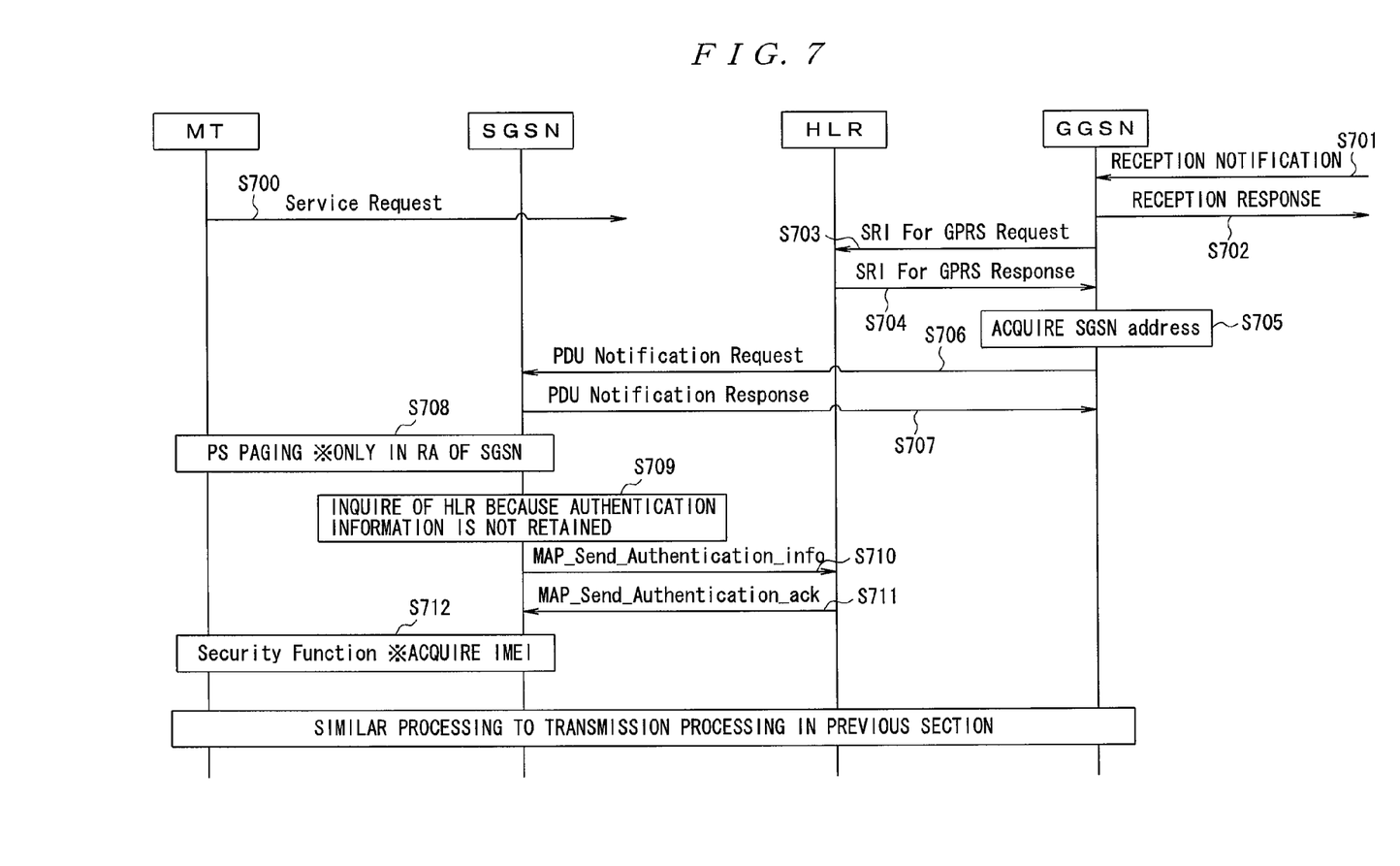
FIG. 7 is a diagram of a communication sequence (at the time of packet reception) in the mobile communication system as the embodiment of the present invention.

FIG. 7 is a diagram of a communication sequence in the mobile communication system as the embodiment of the present invention. Specifically, FIG. 7 illustrates a communication sequence at the time of packet reception.

A request-to-send (Service Request) signal is sent from an MT to a GGSN (step S700).

The GGSN receives a reception notification (step S701), and sends back a reception response (step S702).

The GGSN sends to the HLR a request (SRI For GPRS Request) for transmission path routing information (SRI: Send_Routing_Information) for general packet radio switching (GPRS: General Packet Radio Service) (step S703).

As a response to the request of step S703, a response (SRI For GPRS Response) is sent back from the HLR to the GGSN (step S704).

At the GGSN, an address of the SGSN is acquired (step S705).

Then, when the GGSN sends a request for PDU (Protocol Data Unit) notification (PDU Notification Request) to the SGSN (step S706), the SGSN sends back a PDU notification (PDU Notification Response) to the GGSN (step S707).

After step S707, paging of packet communication (PS paging) from the SGSN to the MT is performed (step S708).

The paging in step S708 is performed only with respect to the MT which has visited in a registration station area (RA: Routing area) managed by the SGSN. RA information required for this is retained locally so that wasteful paging is inhibited.

Because authentication information is not retained in SGSN, the SGSN inquires of the HLR (step S709).

Specifically, the SGSN sends a MAP_Send_Authentication_info signal to the HLR, thereby inquiring whether the MT is a genuine subscriber or not (step S710).

When there is an acknowledgment (MAP_Send_Authentication_ack) to the inquiry of step S710 (step S711), processing for secrecy of communication (Security Function) is executed between the MT and the SGSN (step S712).

In process of this Security Function, the SGSN acquires IMEI (International Mobile Equipment Identity) data.

From then on, a process similar to the process at the time of packet reception is executed as described above.

The present invention can be applied to a mobile communication system, a local subscriber information management device in this system, and a communication information management method. The mobile communication system is configured to include a subscriber original record information management device which manages subscriber original record information that contains original record information of information representing respective mobile terminals and subscriber information corresponding to these mobile terminals, and a local subscriber information management device which acquires subscriber management information that contains information representing the respective mobile terminal that is a visiting mobile terminal and subscriber information corresponding to the respective mobile terminal from the subscriber original record information management device and manages the acquired subscriber management information.

What is claimed is:

1. A mobile communication system comprising:
a subscriber original record information management device for managing subscriber original record information that includes mobile terminal information about each mobile terminal and subscriber information about a subscriber who owns said each mobile terminal; and
a local subscriber information management device for managing subscriber management information of a mobile terminal located in a management area of the local subscriber information management device;
wherein the local subscriber information management device acquires from the subscriber original record information management device the mobile terminal information of the mobile terminal located in the management area of the local subscriber information management device and the subscriber information about a subscriber who owns the mobile terminal located in the management area of the local subscriber information management device to manage the mobile terminal information and the subscriber information, as the subscriber management information;

wherein the local subscriber information management device acquires a mobile equipment identity of the mobile terminal located in the management area, from the mobile terminal located in the management area; and wherein the local subscriber information management device selectively performs processing to prevent retention of the subscriber management information of the mobile terminal located in the management area, after a call control process is performed with the subscriber management information, when it is determined that a call control traffic of the mobile terminal located in the management area rarely occurs based upon at least the mobile equipment identity of the subscriber management information.

2. A local subscriber information management device operatively connected to a subscriber original record information management device for managing subscriber original record information that includes mobile terminal information about each mobile terminal and subscriber information about a subscriber who owns said each mobile terminal, in a mobile communication system, wherein the local subscriber information management device manages subscriber management information of a mobile terminal located in a management area of the local subscriber information management device;

wherein the local subscriber information management device acquires a mobile equipment identity of the mobile terminal located in the management area, from the mobile terminal located in the management area; and wherein the local subscriber information management device selectively performs processing to prevent retention of the subscriber management information of the mobile terminal located in the management area, after a call control process is performed with the subscriber management information, when it is determined that a call control traffic of the mobile terminal located in the management area rarely occurs based upon at least the mobile equipment identity of the subscriber management information.

3. A communication information management method for a mobile communication system, the mobile communication system comprising:

a subscriber original record information management device for managing subscriber original record information that includes mobile terminal information about each mobile terminal and subscriber information about a subscriber who owns said each mobile terminal, and a local subscriber information management device for managing subscriber management information of a mobile terminal located in a management area of the local subscriber information management device;

the communication information management method comprising:

acquiring from the subscriber original record information management device the mobile terminal information of the mobile terminal located in the management area of the local subscriber information management device and the subscriber information about a subscriber who owns the mobile terminal located in the management area of the local subscriber information management device to manage the mobile terminal information and the subscriber information, as the subscriber management information;

acquiring a mobile equipment identity of the mobile terminal located in the management area, from the mobile terminal located in the management area; and selectively performing processing to prevent retention of the subscriber management information of the mobile terminal located in the management area, after a call control process is performed with the subscriber management information, when it is determined that a call control traffic of the mobile terminal located in the management area rarely occurs based upon at least the mobile equipment identity of the subscriber management information.

4. The mobile communication system according to claim 1, wherein the mobile equipment identity of the mobile terminal located in the management area is any one of an IMEISV (International Mobile station Equipment Identity and Software Version number) and an IMEI (International Mobile station Equipment Identity).

5. The mobile communication system according to claim 4, wherein when it is determined that the mobile terminal located in the management area is incorporated in a vending machine or general-purpose equipment, the local subscriber information management device selectively performs the processing to prevent the retention of the subscriber management information.

6. The mobile communication system according to claim 4, wherein when it is determined that the mobile terminal located in the management area is not incorporated in a vending machine or general-purpose equipment, the local subscriber information management device performs a location registration of the mobile terminal, instead of selectively performing the processing to prevent the retention of the subscriber management information.

7. The mobile communication system according to claim 1, wherein selectively performing the processing to prevent the retention refers to erasing or deletion processing, or processing of not storing as the subscriber management information.

8. The mobile communication system according to claim 1, wherein, when the local subscriber information management device selectively performs the processing to prevent retention of the subscriber management information of the mobile terminal located in the management area, at least Packet Temporary Mobile Subscriber Identity (P-TMSI), International Mobile Subscriber Identity (IMUI), and current Routing Area (RA) are remained in the local subscriber information management device.

* * * * *